Patented July 9, 1929.

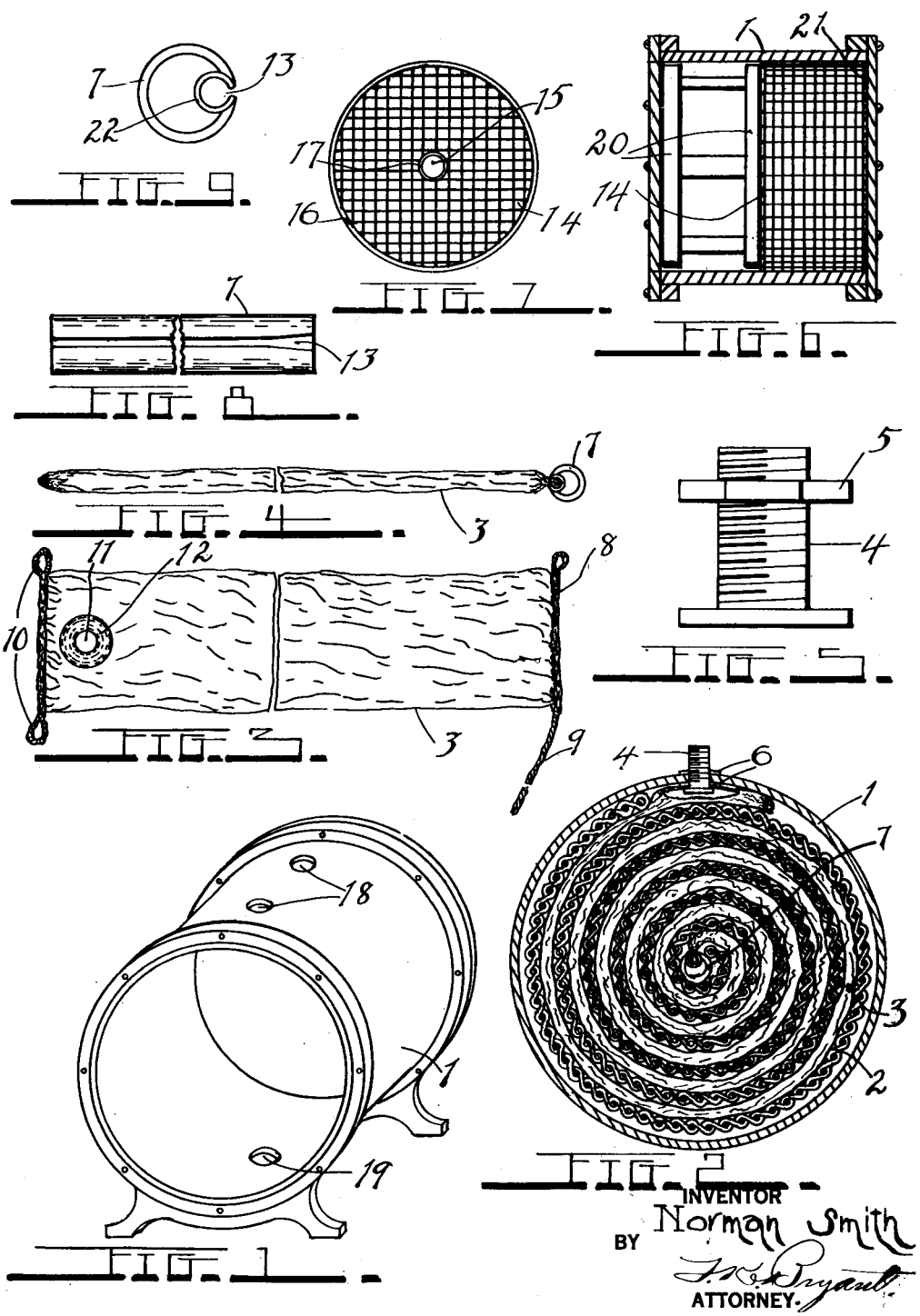

1,720,384

UNITED STATES PATENT OFFICE.

NORMAN SMITH, OF COLORADO SPRINGS, COLORADO.

FILTER.

Application filed September 28, 1928. Serial No. 309,058.

My invention relates to filters, but more specifically to that character of filters adapted to the dry cleaning business.

An object of my invention is to provide a filter which will successfully pass a greater volume of cleaning liquid per given cubic filter space than has hitherto been deemed possible.

Another object of my invention is to provide a filter of few parts, simply constructed, easily assembled and dissasembled, and with particular reference to high efficiency and positive action.

My invention will be more readily understood when the specification and claims are read in the light of the accompanying drawing, in which Figure 1 is a perspective view of a suitable container for housing my invention. Fig. 2 is a cross-sectional view of the container or housing with the filtering unit as fitted therein. Fig. 3 is a plan view of the filtering sack element of the filtering unit. Fig. 4 is an edge view of the filtering sack. Fig. 5 is an elevation of a suitable nipple adapted to connect the filtering element or sack to the source of solution supply. Fig. 6 is a horizontal sectional view of a filter housing with a single filter unit in position, and illustrating means for firmly retaining the filter unit against one end of the filter housing. Fig. 7 is an end elevational view of the removable side of the filter unit. Fig. 8 is a broken longitudinal side elevational view of a closure for the open end of the filter sack. Fig. 9 is an end view of the sack closure.

Referring more in detail to the accompanying drawing, the numeral 1 indicates a suitable housing for the filter unit of this invention. 2 indicates a woven wire, expanded metal or other pervious material, spirally formed supporting element. 3 indicates a fabric filter sack. 4 indicates a nipple adapted to connect filter sack 3 through casing 1 with the source of solution supply. 5 indicates a nut adapted to securely clamp the filter sack 3 to the casing 1. 6 indicates suitable washers for effecting a solution tight joint between the filter sack and the casing. 7 indicates a detachable closure element for the open end of the filter sack. 8 indicates the corded and reinforced open end of the filter sack 3. 9 indicates an extension cord adapted to facilitate the placement or removal of the element 7. 10 indicates loops on the closed end of the filter sack 3 adapted to hang the sack in a vertical position to facilitate drying. 11 indicates a hole in one side of the filter sack 3, adapted to receive the nipple 4. 12 indicates reinforcement for the hole 11. 13 indicates a slot in the element 7. 14 indicates the detachable end of the filter sack supporting element 2. 15 indicates a hole in element 14 adapted to pass over element 7. 16 indicates a reinforcement for the outer edge of element 14. 17 indicates a reinforcement for the hole 15 in the element 14. 18 indicates inlet holes in the casing 1. 19 indicates an outlet hole in the bottom of the housing 1. 20 indicates means for retaining the filter unit securely against one end of the filter housing 1. 21 indicates the non-removable end of the element 2. 22 indicates a smaller slotted tube within the larger slotted tube 7, the two tubes being rigidly secured together to form a more rigid construction than would be possible with a single tube.

After spending much time, thought, and money in an effort to provide adequate and efficiently practical filtering means from commercial apparatus; I decided that a step forward must be made if successful filtering was to be obtained in my business, (the dry cleaning business). I therefore, proceeded to evolve something which would prove adequate, this invention being the culmination of my efforts.

Constructional details are, a filter sack, 3 in the drawings, of suitable material for the purpose. This filter sack is relatively long compared to its breadth, and comparatively thin compared to its breadth. One end of this sack is permanently closed. A hole 11 near the closed end is provided for nipple 4; this hole is to be amply reinforced as indicated at 12. The closed end may also be reinforced by cording or taping as indicated in the drawings. The open end is corded or otherwise reinforced as indicated at 8. This reinforcement may be extended to form a loop at one side and an extension at the other side as indicated at 9. This loop and extension of the reinforcement serves to facilitate the placement and removal of element 7. The loops 10 at the closed end are adapted to hang the sack in a vertical position for drying.

A strip of hardware cloth, expanded metal or other suitable porous material slightly wider than the filter sack 3, is rolled in a spiral having the desired number of convolutions, as indicated in Fig. 2. A side or end element of the same material as element 2, as indicated in Fig. 7, element 14 is rigidly secured to one edge of element 2. A duplicate of element 14 is provided to be detachably secured to the other edge of element 2. The unit built up from elements 2, and 14 I term a cage. This cage is provided to support and retain filter sack 3 in its proper and safe position.

The detachable element 14 is securely held in position as indicated in Fig. 6, by element 20, or, in the event that the container 1 is of the proper size to hold the completed unit, the element 14 would be retained between the heads of the element 1. Obviously, a plurality of filter units may be operated in a single container.

For closing the open end of the filter sack 3, a slotted element 7 is provided. This element may be constructed as indicated in the drawings or it may be constructed from a suitable tube having a cross section of sufficient proportions to provide the required rigidity. This slotted element 7 may be bevelled as indicated at 13.

A nipple such as is indicated in Fig. 5 is provided to retain the filter sack and provide a solution proof connection between the filter sack and the casing 1. This nipple also provides means for introducing solution into the filter sack.

Assembly is made as follows: The hardware cloth element 2 may be set on its side, the open end of the filter sack having been closed by the element 7; this end and element 7 is placed in the center as indicated in Fig. 2, the filter sack being placed between the spiral convolutions of element 2, and carried around to the outer end of element 2. The detachable end 14 may then be placed in position and the whole unit placed in container 1. The nipple 4, is then passed through one of the inlet holes 18 of the container 1, as indicated in Fig. 2, a packing washer 6 being then placed in position and the nut 5 set up to form a solution tight joint. Should the filter container be longer than the filter unit, an element 20 may be provided so that when the container head is set tight, the filter unit will be securely and tightly positioned within the container 1. Connection is then made from the solution supply to the nipple 4, and an outlet connection made from opening 19 to any desired part of the system.

In operation this filter unit is placed in a solution circuit in the usual manner. I have had in constant operation in my plant for a period of many months a filter unit, as illustrated and described in this specification, occupying a cubic space of approximately one and one quarter cubic feet (1.25 cu. ft.) which successfully passes approximately 25 gallons of solution per minute. This filter has been proven highly successful and efficient under commercial working conditions.

This filter is easily cleaned when necessary, it being only necessary to remove the filter sack from its cage, hang it up by loops 10 so that it may become thoroughly dry when practically all accumulations may be shaken out, after which it may be washed in any desired manner.

While I have illustrated and described a preferred assembly construction of my invention as applied to my particular business, I do not wish to be limited thereby, but to be limited only in so far as the prior art may disclose anticipations.

What I claim as my invention is:

1. A filter of the character described comprising a rigid and permanently formed hardware cloth cage, said hardware cloth cage being composed of a central open ended spiral of hardware cloth, a hardware cloth side permanently secured to one edge of said spiral, another hardware cloth side adapted to be detachably secured to the other side of said spiral, a filter fabric sack positioned within the convolutions of said preformed spiral, said filter fabric sack being supported by said hardware cloth cage.

2. A filter of the character described comprising a permanently formed expanded metal cage, said expanded metal cage being composed of a central open ended spiral of expanded metal, an expanded metal side permanently secured to one edge of said spiral, and a removable expanded metal side adapted to be detachably secured to the other edge of said spiral, a filter fabric sack positioned within the convolutions of said preformed spiral, said filter fabric sack being supported and retained in position by said expanded metal cage.

3. A filter of the character described comprising a permanently formed hardware cloth cage, said cage having an internal spirally arranged element with the spaced convolutions secured against the movement, said spiral arrangement supporting a liquid permeable filtering bag positioned between the convolutions of said spiral, said filtering bag having an inlet opening and nipple near its closed end, and having a mouth at the other end with detachable mouth closing means.

4. A filter comprising a liquid tight casing having an inlet opening, and an outlet opening, a perforated metal cage located therein and arranged in spaced coils, and a bag of permeable fabric arranged between the coils of the cage and supported thereby, the cage being provided with one permanently attached perforated end and a perforated removable end secured to the ends of the convolutions of the cage.

5. A filter of the character described comprising a casing having an inlet and outlet, a permanently preformed reticulated spiral cage proportioned substantially to occupy the entire area within the casing surrounding the cage, a filtering sack spirally arranged between the convolutions of the cage, a feed nipple for the sack projecting through the casing inlet, the liquid filtering through the sack entering the casing and escaping through the casing outlet, a permanent reticulated closure for one end of the cage and a removable closure for the other end thereof.

6. Filtering apparatus comprising a casing, a preformed rigid spiral cage of reticulated material, a filtering sack of a length to fill the spaces between the convolutions of the cage, said cage and sack occupying substantially one-half of the interior of the casing, and a spacer in the casing engaged with the cage and adjacent end wall of the casing to hold the cage positioned therein.

7. Filtering apparatus comprising a casing, a preformed rigid spiral cage of reticulated material, a filtering sack of a length to fill the spaces between the convolutions of the cage, said cage and sack occupying substantially one-half of the interior of the casing, a spacer in the casing engaged with the cage and adjacent end wall of the casing to hold the cage positioned therein, and said casing and cage being relatively proportioned whereby the casing may hold one or two cages and sacks and be retained against relative movements when the material to be filtered is flowed into the sacks under pressure.

8. A filter of the character described comprising a rigid and permanently formed hardware cloth cage, said hardware cloth cage being composed of a central open ended spiral of hardware cloth, a hardware cloth side permanently secured to one edge of said spiral, another hardware cloth side adapted to be detachably secured to the other side of said spiral, a filter fabric sack positioned within the convolutions of said preformed spiral, said filter fabric sack being supported by said hardware cloth cage, a casing into which the assembled cage and sack are removably positioned, and a removable wall for the casing to close the entrance opening for the assembled cage and sack.

In testimony whereof I affix my signature.

NORMAN SMITH.